INVENTOR.
HIRAM E. TEMPLE

United States Patent Office 3,450,068
Patented June 17, 1969

3,450,068
CONTINUOUS BAKERY PRODUCT HANDLING SYSTEM
Hiram E. Temple, Saginaw, Mich., assignor to Baker Perkins Inc., Saginaw, Mich., a corporation of New York
Filed Sept. 19, 1966, Ser. No. 580,278
Int. Cl. A21c 5/08, 13/02, 3/04
U.S. Cl. 107—4                               2 Claims

ABSTRACT OF THE DISCLOSURE

A bakery product handling system wherein a pair of connected, contiguous proofing and baking chambers having entrances and exits are provided with a common conveyor means leading in a direction of travel through the proofing and baking chambers consecutively and back to the proofing chamber, substantially horizontally extruding extrusion means is provided for supplying bread dough, conveyor means leads from the extrusion means to a point adjacent the proofing chamber entrance and has a portion in parallel alignment with the pans which travel the continuous conveyor circuit in spaced apart relation broadside to the direction of travel, slicing means is provided for cutting the dough into pan size lengths, and a transfer member is employed for moving the dough lengths cut by the slicing means successively into the pans at the proofing chamber.

---

This invention relates to bakery product handling systems and more particularly to systems for processing dough pieces in elongate loaves continuously through a series of connecting treating chambers such as a proofing unit and an oven unit. With the advent of processes and machines for preparing bread dough continuously in the manner illustrated, for instance, in the United States Baker Patent No. 2,953,460, issued Sept. 20, 1960, the fully automated bakery has now become commercially feasible and the present invention is directed to apparatus for processing continuously produced dough through the proofing and baking steps in a continuous manner.

One of the prime objects of the invention is to provide a system wherein dough may be extruded from a continuous dough making machine such as that illustrated in the patent mentioned, cut into elongate loaves, and moved into elongate pans traveling on a conveyor system which proceeds continuously through a proofing chamber and an oven chamber.

A further object of the invention is to provide apparatus of the character described wherein the time of continuous travel of the loaves through the respective chambers is selectively variable.

Still a further object of the invention is to provide continuous processing apparatus of the type mentioned wherein separate chambers have vertical tiers of runs connected by a run at one end of the chambers extending through a tunnel connecting the chambers which may be curtained to maintain separate atmospheres within the chambers.

Figure 1:
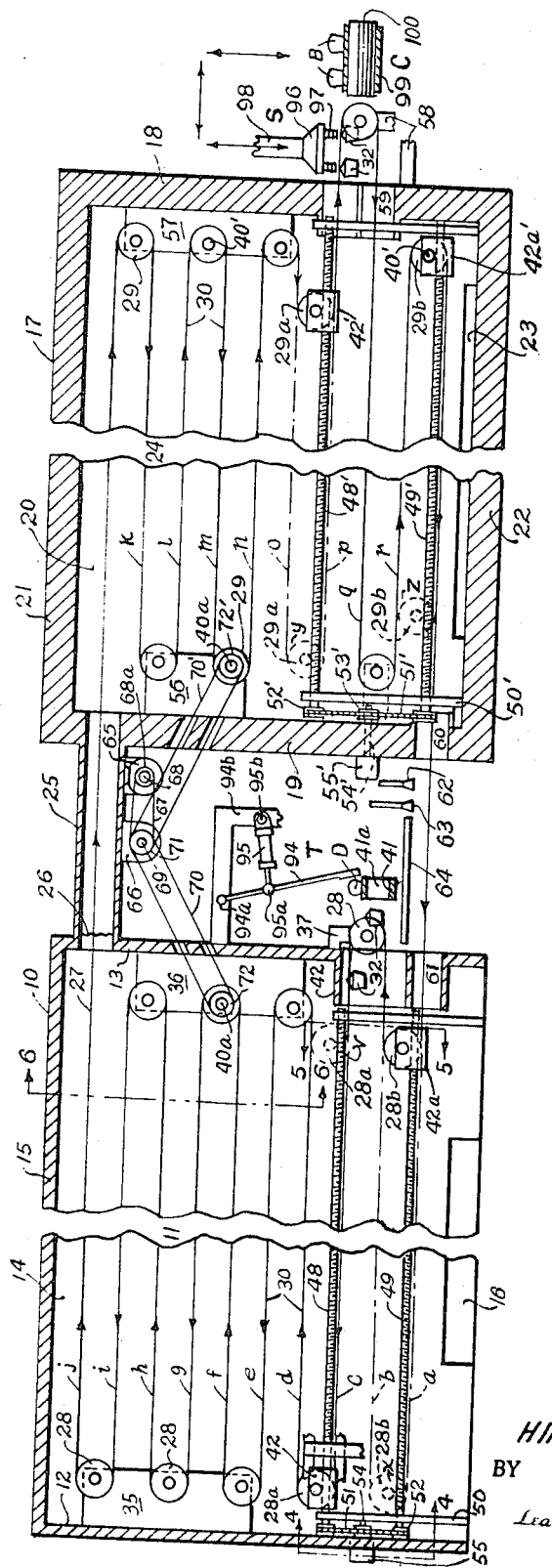
Figure 2:
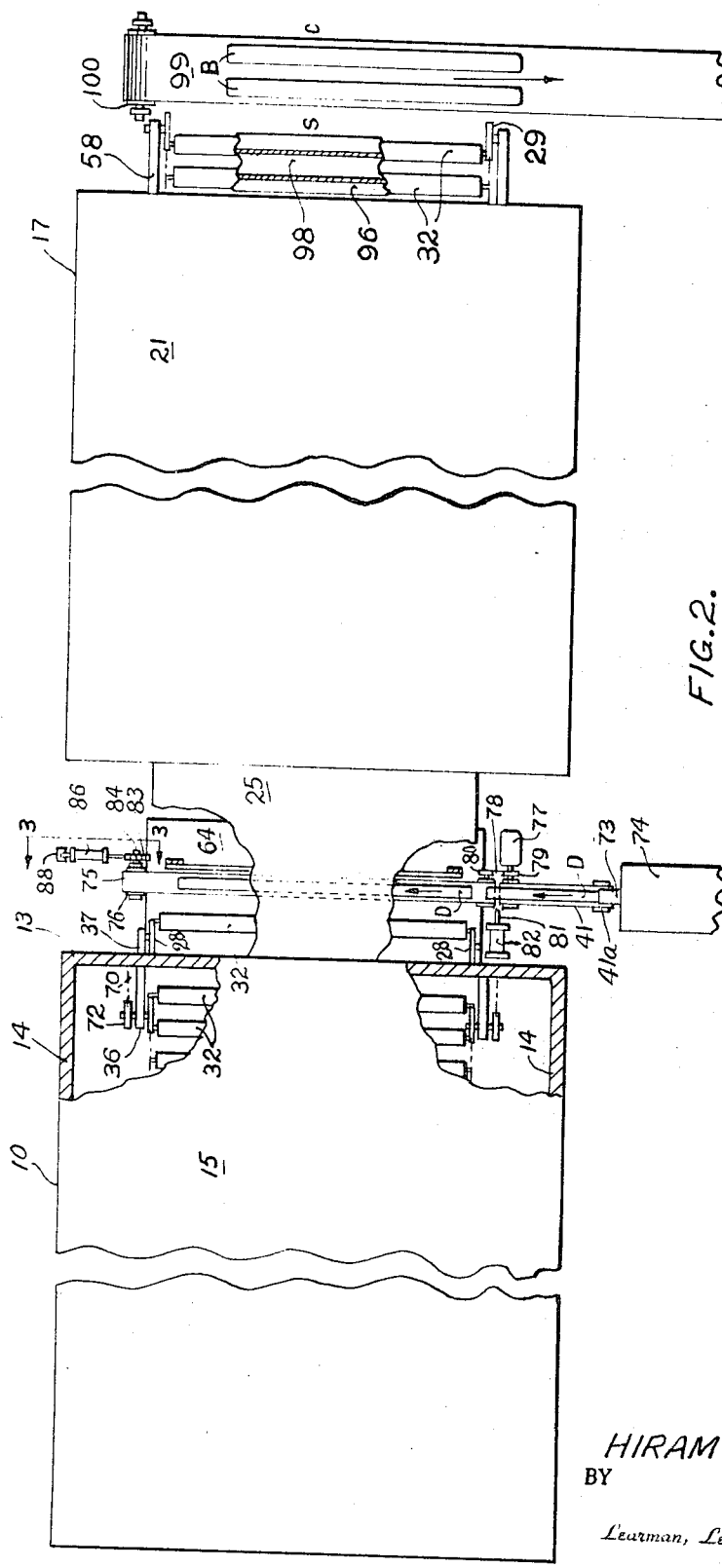
Figure 3:
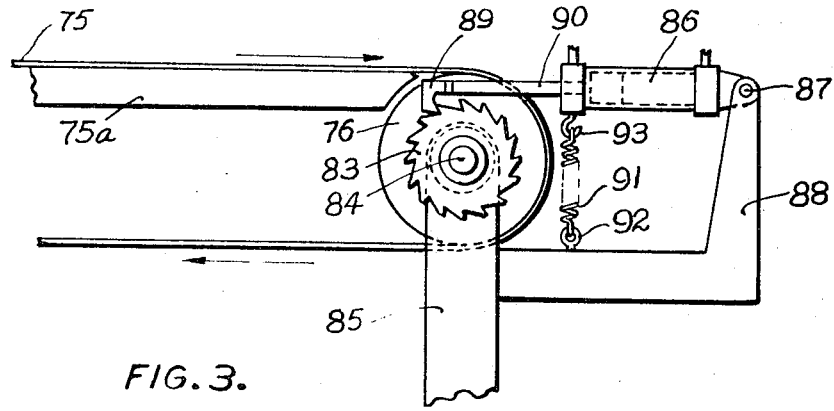
Figure 4:
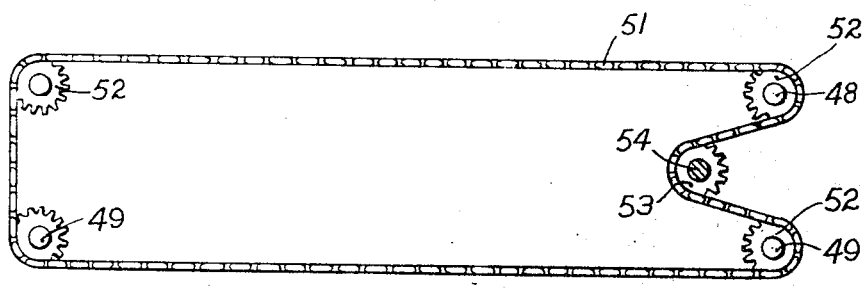
Figure 5:
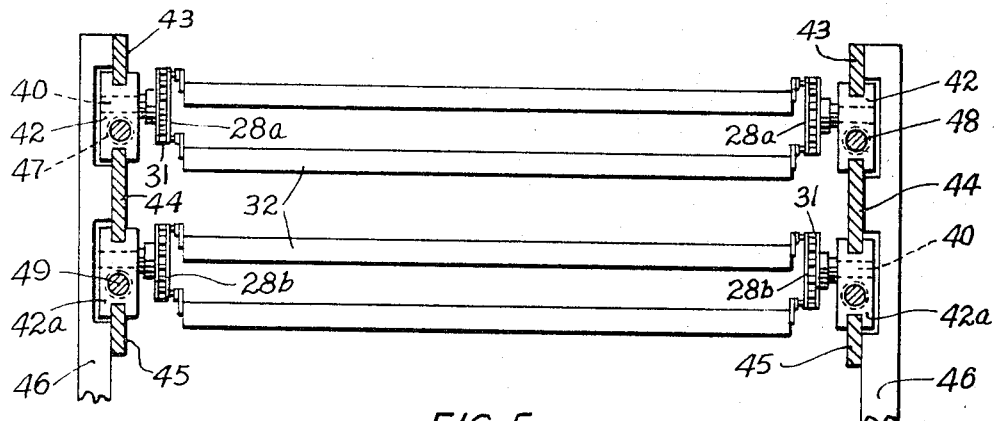
Figure 6:
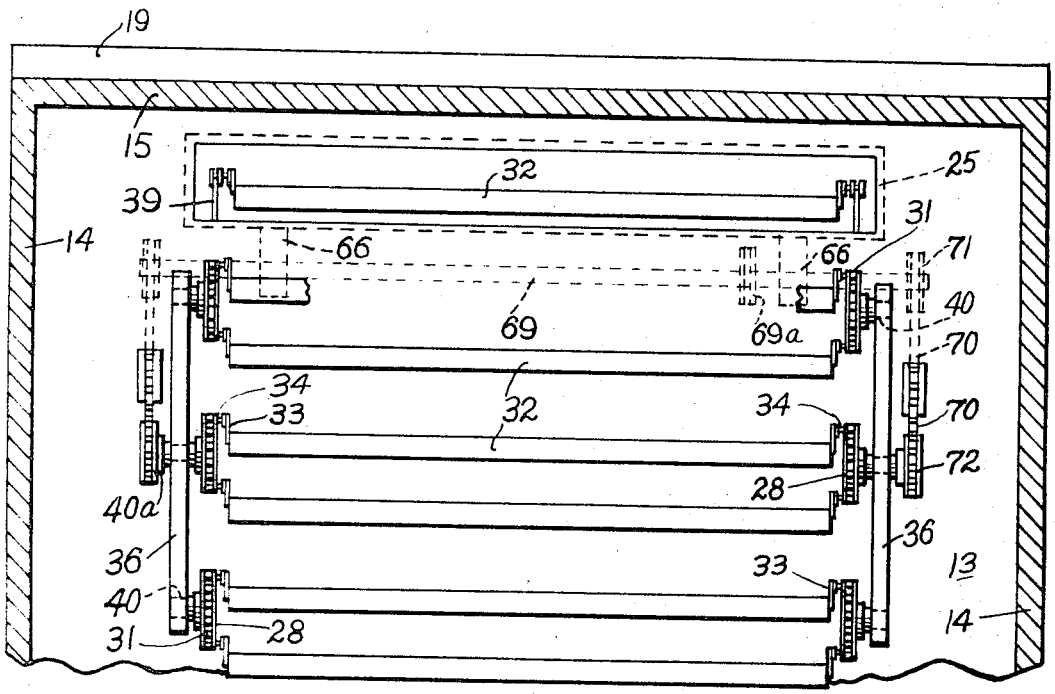

Other objects and advantages of the invention will be pointed out specifically or will become apparent from the following description when it is considered in conjunction with the appended claims and the accompanying drawings, in which:

FIGURE 1 is a partly schematic, sectional elevational view illustrating my continuous conveyor circuit, diagrammatic lines indicating adjusted positions of certain of the sprockets and chain runs trained around them so that it is clear how the length of travel of the product is varied within the proofing and baking chambers;

FIGURE 2 is a top plan view thereof;
FIGURE 3 is an enlarged, vertical sectional view taken on the line 3—3 of FIGURE 2;
FIGURE 4 is an enlarged, fragmentary, vertical sectional view taken on the line 4—4 of FIGURE 1;
FIGURE 5 is an enlarged, fragmentary, vertical sectional view taken on the line 5—5 of FIGURE 1;
FIGURE 6 is an enlarged, fragmentary, vertical sectional view taken on the line 6—6 of FIGURE 1.

Referring now more particularly to the accompanying drawings, a numeral 10 generally indicates a surrounding enclosure for a proofing chamber generally designated 11 which may comprise end walls 12 and 13, side walls 14 and a roof or top wall 15. Suitable apparatus for conditioning the air atmosphere within the proofing chamber 11, including means for controlling the temperature and humidity of the air and fan means for circulating it through the chamber 11, all of which are of a conventional nature, is shown at 16. The proofing enclosure 10 is connected with an oven enclosure generally designated 17 which, as shown, may comprise end walls 18 and 19, side walls 20 and upper and lower end walls 21 and 22, respectively. Conventional heater units, generally designated 23, may be provided for heating the oven chamber, generally designated 24, to the desired temperature. As FIGURES 1 and 2 particularly indicate, the chambers 11 and 24 are connected by a tunnel 25 at their upper ends and a flexible curtain 26 is provided in the tunnel 25 which is of a suitable nature to substantially separate the atmospheres of the chambers 11 and 24, the curtain 26 being secured at its upper end only so that pans containing the dough may pass through the tunnel 25 from the chamber 11 to the chamber 24.

An endless conveyor circuit generally designated 27 extends through the oven chamber 14 along a sinuous path comprising vertically spaced runs a-j which at their ends are trained around transversely spaced pairs of sprockets generally designated 28. The runs j are elongate runs which extend through the tunnel 25 and on into the oven chamber 24 and the conveyor circuit thence sinuously continues in a series of vertically spaced pairs of runs k-r and finally returns to the elongate runs a which, as noted earlier, include portions within the proofing chamber 11 and portions extending between the two chambers. The runs within oven chamber 24 pass around end sprockets generally designated 29 in the manner indicated. As FIGURES 5 and 6 particularly indicate, the runs a-r of the conveyor circuit 27 are made up of a pair of transversely spaced chains 31 which have trough-like, elongate pans 32 supported between them, except in several instances the pans 32 are omitted in FIGURE 1 for the sake of clarity. Pans 32 may be supported by the chains 31 in any convenient manner so that they will always be in an upright position. As shown, they are supported on strap frames 33 which pivotally connect to pins 34 projecting from selected spaced apart links of the roller chains. Sprockets 28 within chamber 11 may be rotatably supported from outboard support walls such as shown in the chamber 11 at 35 and 36, and the one pair of sprockets 28 outside chamber 11 may be journaled on supports 37 fixed on the end wall 13. Guides 39 (FIGURE 6) may be provided to support the chains 31 within tunnel 25. Stub shafts 40 journaled by the various supports may be provided to support the sprockets 28 in the usual manner.

In FIGURE 1 an endless conveyor belt 41 is shown supporting an extruded dough piece D which is to be transferred to the directly adjacent, open top pan 32 proceeding on runs b around the sprockets 28 supported just outwardly of the mouth or entrance 42 of the proofing chamber 11. The transversely spaced pair of sprockets 28a shown in solid lines immediately upstream thereof and the transversely spaced pair of sprockets 28b shown in solid lines immediately downstream thereof are supported differently (see FIGURE 5) than the remaining sprockets 28 which are mounted in fixed position for rotary movement only. The stub shafts 40 supporting these sprockets 28a and 28b are journaled in slide bearing blocks 42 and 42a, respectively, which are mounted for longitudinal sliding movement along vertically spaced pairs of rails 43, 44 and 45 which are supported along both sides of the chamber 11 by vertical support posts 46.

As FIGURES 1 and 5 indicate, the slide bearings 42 include threaded openings 47 which accomodate a pair of actuating screws 48 in the case of slide bearings 42, and 49 in the case of slide bearings 42a. To revolve these screws 48 and 49, which are of opposite hand and may be supported by vertical support members 50 in a manner such that they may revolve but are restrained from axial movement, an endless chain 51 (see FIGURE 4) is trained around the sprockets 52 which are fixed to the screws 48 and 49, the chain 51 also being trained around a sprocket 53 which is mounted on the output shaft 54 of a suitable gear motor 55. Thus, when the gear motor 55 is operated to revolve shafts 48 and 49, the sprockets 28a on slide bearings 42 will be moved longitudinally in one direction and the sprockets 28b on slide bearings 42a will be moved in the opposite direction.

In the oven chamber 24, similar supports, outboard of the sprockets 29 which are journaled on stub shafts 40', are provided for supporting sprockets 29 and, as shown, comprise support wall members 56, 57 and 58, the latter supports 58 supporting the pair of sprockets 29 which are outside the product discharge opening 59 in the oven end wall 18. The pair of sprockets 29a shown in solid lines immediately upstream of the discharge opening 59 and a pair of sprockets 29b downstream thereof are mounted in the manner of the pairs of sprockets 28a and 28b, respectively, to travel longitudinally in the same manner on slide bearings of the type identified by numerals 42 and 42a. Accordingly, those numerals employed to designate the various parts of the sprocket adjusting assembly which is provided in the chamber 11 are also used in primed form to designate identical parts in the oven chamber 24 and no further description of these parts is necessary except to mention that the screws 48' and 49' in chamber 24 are both of the same hand and, when revolved, operate to move the bearings 42 and 42a in the same direction.

As previously indicated, the runs a are elongate runs which include portions in both chambers 11 and 24 and portions which proceed out an opening 60 in the end wall 19 of oven enclosure 17 and in through an opening 61 in the end wall 13 of proofer enclosure 10. Provided just above these connecting portions of runs a, just adjacent the opening 60, is an air nozzle 62 to blow out any remaining crumbs or the like in the empty pans 32 which proceed out oven opening 60, and a greasing nozzle 63 is provided just downstream thereof to spray the pans 32 preparatory to again depositing dough pieces in them. A servicing platform 64 is also provided, as shown, on which an operator may stand to service the dough piece transfer equipment which will presently be described.

A suitable electric motor 65, supported under tunnel 25 adjacent supports 66, is provided to drive the entire continuous conveyor system 27 (see FIGURES 1 and 6). A chain 67 trained around a sprocket 68a on armature shaft 68 of the motor 65 and around a sprocket 69a drives a jack shaft 69 journaled by the supports 66. Pairs of chains 70 trained around drive sprockets 71 on the ends of shafts 69 and around sprockets 72 supported on extensions 40a of the shafts 40 supporting one pair of sprockets 28 are provided to drive the sprockets 28 in a direction to move the chains 30 in chamber 11 in the direction of the arrows, and a similar pair of chains 70' driven by the shaft 69 are trained around sprockets 72' mounted on suitable shaft extensions 40a' of shafts 40 supporting a pair of the sprockets 29 and operate to drive the chains 30 in the oven chamber 24 in the direction of the arrows.

As FIGURES 1 and 2 particularly indicate, dough D is extruded continously from the extruding nozzle 73 of a continous dough producing machine 74 which may be of the character disclosed in the aforementioned United States Baker patent and delivers dough to the endless conveyor belt 41 which may be trained around rollers 41a. Disposed forwardly of the belt 41 is an endless belt 75 trained around guide 75a and rollers 76. As FIGURE 1 indicates, a motor 77 is provided for driving the one end roll 41a around which belt 41 is trained, and the belt 75 is driven at the same speed by means of a chain 78 trained around a sprocket 79 on the drive shaft mounting roll 41a and a sprocket 80 on the drive shaft which mounts the adjacent roll 76. A severing knife 81 mounted on the piston rod of a fluid pressure operated power cylinder 82 is provided for severing the extruded dough when it has reached the desired length, which typically may be in the neighborhood of twelve feet. In order to create a gap between the severed length of dough and the dough proceeding from the extruding nozzle 73, a ratchet wheel 83 (see FIGURE 3) is fixed to one end of a shaft 84 on which the other roll 76 is mounted, shaft 84 being journaled by a post 85. A double-acting, fluid pressure operated power cylinder 86 pivotally mounted as at 87 on a support arm 88 extending from post 85 has a pawl 89 connected with its poston rod 90 which is operative when the piston rod 90 is retracted to advance the roll 76 at a faster rate of speed than belt 75 is driven and accordingly advance the belt 75 to create the gap between the severed length of dough D and the dough piece from which it has been severed. A spring member 91 connected as at 92 to the arm 88 and as at 93 to the front end of cylinder 86 permits the pivoting of cylinder 86, which allows the pawl 89 to return to the position in which it is shown in FIGURE 3.

Provided to remove the severed dough length from the conveyor belt 75 into a pan 32 is a transfer device generally designated T comprising an arm 94 pivotally mounted as at 94a on a bracket 94b extending from the proofer front wall 13. Mounted on bracket 94b to operate transfer arm 94 is a fluid pressure operated cylinder 95 which pivotally connects to the arm 94 at 95a and to the bracket 94b at 95b.

While it is contemplated that the conveyor circuit 27 could extend to a third bread cooling chamber similar in nature to the proofing chamber 11 and oven chamber 24, in the present instance a suction device generally designated S is shown which travels the path indicated by the arrows in FIGURE 1 to remove the elongate loaves of baked bread B from the pans 32 and deposit them on a discharge conveyor generally designated C. In the present instance the suction transfer device is depicted as comprising a manifold 96 mounting two rows of vertically extending, open ended, rubber bellows suction cups 97 adapted to be lowered into engagement with the tops of the bread loaves B in pans 32. A suction conduit 98 extends upwardly from the member 96 and connects with a suitable suction fan or the like. Once the suction cups 97 are in engagement with the bread, suction will tend to raise the bread loaves B from the pans 32 and also the suction device S is lifted, moved horizontally, and then lowered to deposit the bread loaves B on the conveyor C. At the time of deposit, the suction fan is out of communication with the manifold 96 and the transfer device S then returns in the path previously followed to the position shown in FIGURE 1. The conveyor C may comprise an endless belt 99 trained around end rollers 100 which is driven in a direction to convey the bread loaves B to a suitable cooler or slicer.

In operation, dough moves continuously from the extruding nozzle 73 to belt 41 and on to belt 75. At properly timed intervals the knife 81 is operated to sever the dough D and as knife 81 is returning, cylinder 86 is operated to advance the continuously traveling belt 75 and create the necessary gap between the severed dough length D and the dough being continuously extruded. The cylinder 95 is then operated to swing transfer arm 94 and move a dough piece D into the pan 32 rising to meet it and in which the dough piece D is carried through the proofing chamber 11, through tunnel 25, and over into baking chamber 24. Finally, the suction transfer device S removes the baked bread from the pans 32 in the manner previously described and the pans 32 return once again to proofing chamber 11, receiving an air blast clean-out from the nozzle 62 and a coating of grease from the greasing nozzle 63. The belts 30 travel continuously and all of the elements operate in timed relation so that the operation proceeds continuously. For different varieties of dough, it will be necessary to vary the proofing time and the baking time, and this is simply accomplished by the operator starting motors 55 and 55' and moving them the desired amounts according to a timing scale which enables the operator to properly position the sprockets 28a and 28b and/or 29a' and 29b', as the case may be. Adjusted positions of the sprockets 28a and 28b which shorten the length of travel in chamber 11 are shown at v and x, respectively, and adjusted positions of sprockets 29a and 29b which lengthen the time of travel in chamber 24 are shown at y and z, respectively.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a bakery product handling system: a pair of connected contiguous proofing and baking chambers having entrances and exits; conveyor means therein comprising a continuous conveyor circuit leading from outside the proofing chamber in a direction of travel through a proofing chamber entrance into and through the proofing chamber, and thence out of a proofing chamber exit and through an oven chamber entrance and the oven chamber and an oven chamber exit back to the proofing chamber; elongate pans broadside to the direction of travel, traveling the circuit in spaced apart relation; generally horizontally extruding extrusion means for supplying bread dough; conveyor means leading therefrom including a portion in parallel alignment with the pans adjacent a proofing chamber entrance; slicing means for cutting the dough into pan size lengths; said conveyor means including a pair of end-to-end endless conveyors and means for creating a gap between a severed dough length and the dough being extruded, said end-to-end conveyors being driven by a common drive at a common speed and being trained around end rollers, one of said endless conveyors including a belt remote from said extrusion means and the other of said endless conveyors including a belt adjacent said extrusion means and each belt trained over one of said rollers; power operated sprocket and pawl means on the roller for the belt remote from said extrusion means for advancing the latter relative to the belt adjacent the extrusion means while said belts are traveling; and transfer means for moving the dough lengths cut by the slicing means successively into the pans at the proofing chamber.

2. In a bakery product handling system: a pair of connected contiguous proofing and baking chambers having entrances and exits; conveyor means therein comprising a continuous conveyor circuit leading from outside the proofing chamber in a direction of travel through a proofing chamber entrance into and through the proofing chamber, and thence out of a proofing chamber exit and through an oven chamber entrance and the oven chamber and an oven chamber exit back to the proofing chamber; elongate pans broadside to the direction of travel, traveling the circuit in spaced apart relation; generally horizontally extruding extrusion means for supplying bread dough; conveyor means leading therefrom including a portion in parallel alignment with the pans adjacent a proofing chamber entrance; said last named conveyor means comprising a pair of spaced apart endless conveyor members in tandem arrangement; means for driving the endless conveyor members in the same direction and at the same speed; slicing means for cutting the dough into pan size lengths moving into and out of the space between said conveyor members; means for moving the downstream conveyor member forwardly relative to the other conveyor member, while the conveyor members are being driven, to create a gap between dough pieces; and transfer means for moving the dough lengths cut by the slicing means successively into the pans at the proofing chamber.

References Cited

UNITED STATES PATENTS

| | | |
|---|---|---|
| 2,740,362 | 4/1956 | Elliott. |
| 3,288,088 | 11/1966 | Leedy. |
| 1,335,915 | 4/1920 | Pointon. |
| 2,780,182 | 2/1957 | Rand. |

WALTER A. SCHEEL, *Primary Examiner.*

JOSEPH SHEA, *Assistant Examiner.*

U.S. Cl. X.R.

107—57